(12) United States Patent
Lee

(10) Patent No.: US 6,789,506 B1
(45) Date of Patent: Sep. 14, 2004

(54) METHOD FOR INFORMING OVIPOSITION OF CRUSTACEAN AND DEVICE THEREOF

(75) Inventor: Tai-hung Lee, Hokkaido (JP)

(73) Assignee: Japan Science and Technology Corporation, Saitama (JP)

(*) Notice: Subject to any disclaimer, the term of this patent is extended or adjusted under 35 U.S.C. 154(b) by 0 days.

(21) Appl. No.: 10/111,093

(22) PCT Filed: Oct. 22, 1999

(86) PCT No.: PCT/JP99/05842
§ 371 (c)(1),
(2), (4) Date: Jul. 30, 2002

(87) PCT Pub. No.: WO01/28320
PCT Pub. Date: Apr. 26, 2001

(51) Int. Cl.[7] .............................................. A01K 61/00
(52) U.S. Cl. ..................................................... 119/205
(58) Field of Search ................................ 119/204, 205, 119/213, 214, 174

(56) References Cited

U.S. PATENT DOCUMENTS 4,788,427 A * 11/1988 LeRoy ........................ 250/330

OTHER PUBLICATIONS

Carral et al., Aquaculture, vol. 104(3–4), pp. 261–269 (1992).
Minagawa et al., Marine Biology, vol. 115(4), pp. 613–623 (1993).

* cited by examiner

Primary Examiner—Thomas Price
(74) Attorney, Agent, or Firm—Wenderoth, Lind & Ponack LLP

(57) ABSTRACT

The inventions of the application relates to a method and device for detecting the oviposition of crustaceans, which comprises sealing off one of the two gonopores of a female crustacean, covering the other gonopore with a bag, and detecting eggs laid into the bag with a actor. By using this method and device, unfertilized eggs of crustaceans can be easily obtained, thus facilitating the culture and strain improvement of crustaceans.

2 Claims, 2 Drawing Sheets

METHOD FOR INFORMING OVIPOSITION OF CRUSTACEAN AND DEVICE THEREOF

TECHNICAL FIELD

The inventions of this application relates to a method and device for detecting oviposition of crustaceans. More specifically, the present invention relates to a method and device for detecting oviposition of crustaceans for easily and reliably obtaining unfertilized eggs from crustaceans, which is essential for the culture and strain improvement of the animals.

BACKGROUND ART

Unfertilized eggs are essential for the culture and strain improvement of crustaceans such as crabs and lobsters. However, it is difficult to obtain unfertilized eggs from crustaceans due to the following reasons:

(1) Unlike the unfertilized eggs of fishes that remain inside the female body for a while even after ovulation, the unfertilized eggs of crustaceans are discharged from the female body immediately after ovulation.

(2) Since the bodies of crustaceans are covered with a shell, it is not possible to examine ovulation simply by touching the female bodies.

(3) It is literally not possible to predict the exact date and time of ovulation or oviposition.

In order to obtain unfertilized eggs from crustaceans, therefore, the res archers must spend a lot of time watching a female crustacean with their own eyes until oviposition. Not only is this method energy- and time-consuming, problems arise if the researcher misses the moment at which oviposition occurs, and eggs are discharged from the female body, become overripe, and cannot be used.

Therefore, a method by which one can easily and accurately detect the oviposition of crustaceans and a device for signaling it are needed.

DISCLOSURE OF INVENTION

Given the problems arising from the conventional method of obtaining unfertilized eggs from crustaceans, the inventions of this application aim to provide a method and device for detecting the oviposition of crustaceans.

The first invention of this application is a method of detecting oviposition of crustaceans, which comprises sealing off one of the gonopores of a female crustacean, covering the other gonopore with a bag, and detecting eggs laid into the bag with a sensor.

The second invention is a device for detecting oviposition of crustaceans, which comprises a bag, a sensor put inside the bag, a waterproof cordless transmitter connected to the sensor; and a receiver to receive a signal from the transmitter, wherein the bag is set up in such a way that it covers one of the two gonopores of the surface of the crustacean, while the waterproof cordless transmitter is set up on the surface of the crustacean's body so that eggs laid into the bag can be detected by the sensor, and signals can be transmitted from the transmitter to the receiver.

BEST MODE FOR CARRYING OUT THE INVENTIONS

The method according to the first invention of this application is characterized by sealing off one of the two gonopores of female crustaceans, covering the other gonopore with a bag, and detecting eggs laid into the bag with a sensor. This method can be carried out using the device according to the second invention of this application.

Figure 1:
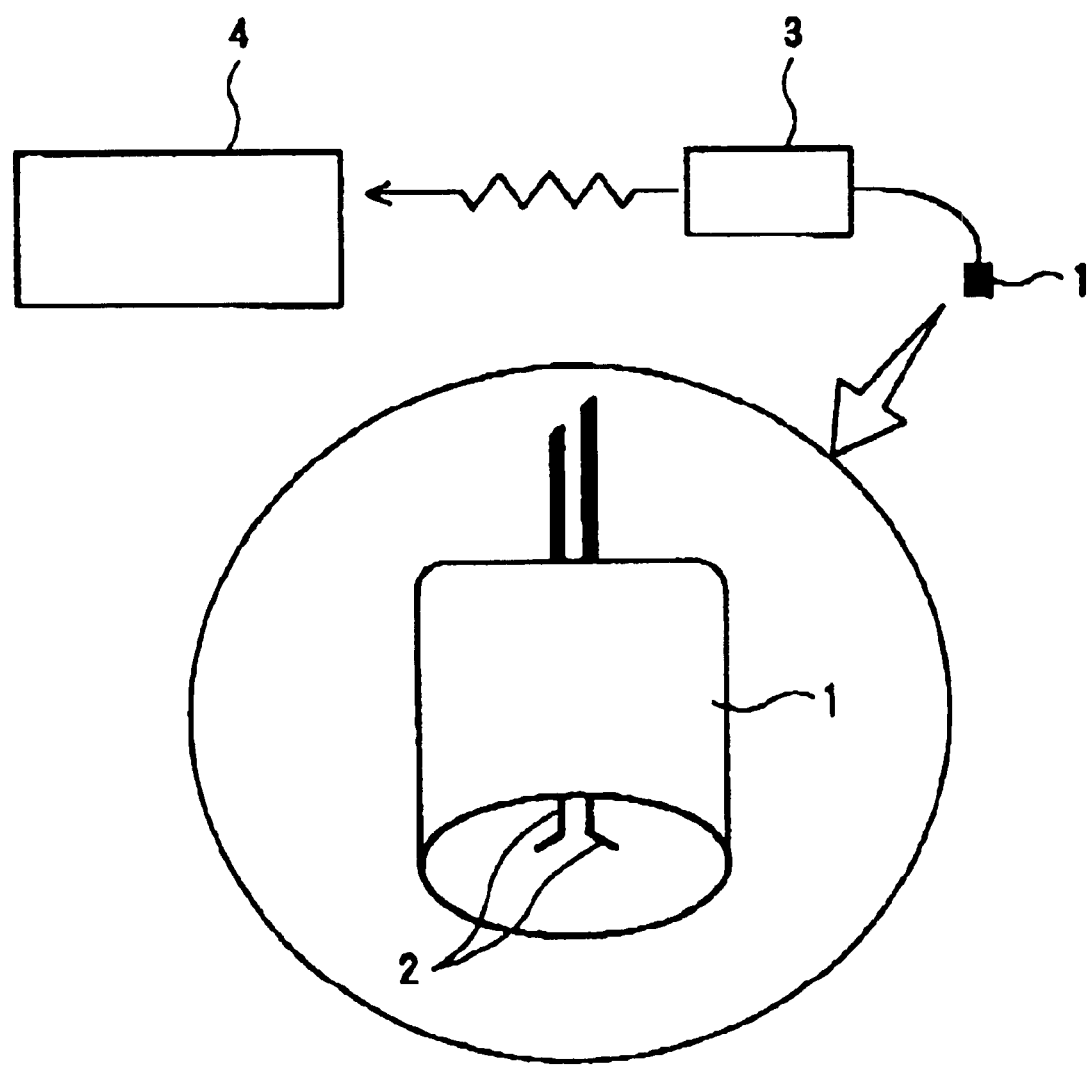
FIG. 1 is a diagram illustrating the configuration of a device according to the second invention of this application.

The device according to the second invention requires a bag (1), a sensor put inside the bag (1), a waterproof cordless transmitter (3) connected to the sensor (2), and a receiver (4) to receive signals from the transmitter (3), as shown in FIG. 1.

Preferably the bag (1) is made of the elastic material such as rubber or flexible resin.

The sensor (2) put inside the bag (1) may be of any type, so long as it operates as soon as it comes into contact with the eggs. For example, in the case of the bipolar sensor shown in FIG. 1, when egg come in contact with the top of the receptors, the sensor will start to operate.

As far as the waterproof cordless transmitter (3) is concerned, a regular small cordless transmitter waterproofed by a resin case or the like can be used. The transmitter (3) is preferably small and lightweight, so that it will not hinder the movements of the crustaceans to which it is attached More importantly, the transmitter must have the same gravity as the water in which the crustaceans are raised.

The receiver (4) must have two functions: the function of receiving signals from the transmitter (3) and the function of conveying them to the user. Various means can be adopted for the latter, e.g., blinking of a light or transmitting a sound through a speaker.

The above-mentioned bag (1) may have a capacity of, for example, 0.1 to 0.5 cc. By using a bag (1) of this size, only a small number of eggs (i.e., the minimum amount required for making the sensor (2) operate: about 1% of the whole eggs) will fill the bag when oviposition occurs, while the majority of the eggs will stay within the ovary without being discharged from the female body. Hence, unfertilized eggs can be collected.

Figure 2:
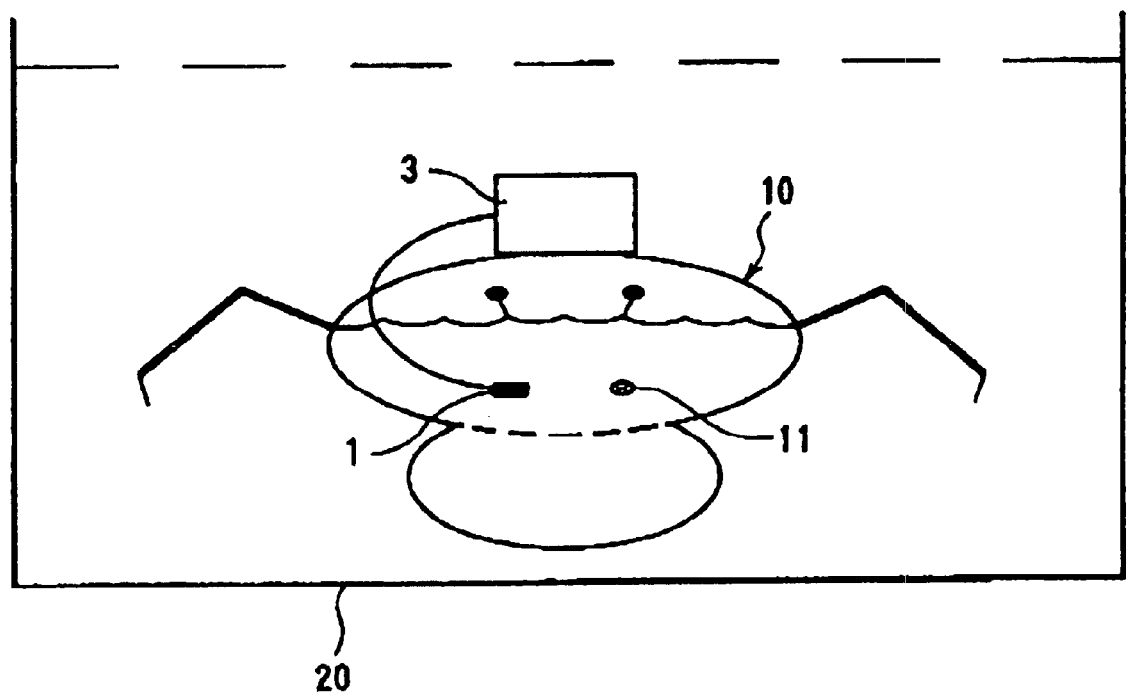
FIG. 2 is a diagram showing the state that the method according to the first invention of this application is carried out using a crab equipped with the device to the second invention of this application.

FIG. 2 illustrates how the method according to the first invention is carried out using the device according to the second invention. In this figure, a crab is shown as an example of crustaceans.

Firstly, one of the two gonopores (11) of a crab (10) is sealed off using an adhesive and the like.

Secondly, the other gonopore is covered with a bag (1). This is performed by adhering an open edge of the bag (1) around the gonopore of the crab (10) with an adhesive.

The waterproof cordless transmitter (3) connected to the sensor (2) put in the bag (1) is then attached to the surface of the body of the crab (10). The position for attaching the transmitter (3) is not specified. In the case of crabs, it is preferable to attach the transmitter to the back shell of the animals.

The crab (10) to which the device is attached is transferred to a water tank (20). The researcher waits for signals from the receiver (4). When oviposition of the crab (10) is confirmed by the signals from the receiver (4), the crab (10) is immediately taken out from the water tank (20), and the bag (1) is removed from the gonopore, so that the fresh unfertilized eggs in the ovary can be discharged to a Schale or the like. In so doing, however, there is possibility of collecting fertilized eggs. To avoid this problem, it is recommended, that the female crab be dissected so the unfertilized eggs can be taken out of the ovary. Alternatively, one can use a syringe and extract unfertilized eggs directly from the ovary.

In an experiment using this device with a female Eriocheir japonicus, the moment of oviposition was accurately detected without any influence on the activity. As a result, fresh and unwounded unfertilized eggs were obtained in an efficient way.

Industrial Applicability

Unfertilized eggs of crustaceans can be obtained easily and efficiently using the method and the device provided by the inventions of this application for detecting and signaling th oviposition of crustaceans. These inventions will facilitate the culture and strain improvement of crustaceans.

What is claimed is:

1. A method of detecting oviposition of crustaceans, which comprises sealing off one of the gonopores of a female crustacean, covering the other gonopore with a bag, and detecting eggs laid into the bag with a sensor.

2. A device for detecting oviposition of crustaceans, which comprises a bag, a sensor put inside the bag, a waterproof cordless transmitter connected to the sensor; and a receiver to receive a signal from the transmitter, wherein the bag is set up in such a way that it covers one of the two gonopores of the surface of the crustacean, while the waterproof cordless transmitter is set up on the surface of the crustacean's body so that eggs laid into the bag can be detected by the sensor, and signals can be transmitted from the transmitter to the receiver.

* * * * *